US005660032A

United States Patent [19]

Neuerburg et al.

[11] Patent Number: 5,660,032
[45] Date of Patent: Aug. 26, 1997

[54] LOCKING MECHANISM FOR AGRICULTURAL MACHINE

[75] Inventors: Horst Neuerburg, Saverne; Jean Paul Haberkorn, Monswiller; Joel Wilhelm, Saint Louis; Rino Ermacora, Saint Jean Saverne; Jean-Paul Lacroix, Mommenheim, all of France

[73] Assignee: Kuhn S.A., Saverne Cedex, France

[21] Appl. No.: 529,621

[22] Filed: Sep. 18, 1995

[30] Foreign Application Priority Data

Sep. 16, 1994 [FR] France ................... 94 11230

[51] Int. Cl.⁶ ................................................. A01D 34/00
[52] U.S. Cl. ......................... 56/14.9; 56/6; 56/15.7; 56/DIG. 14
[58] Field of Search ................... 56/14.9, 6, 15.2, 56/15.1, 15.7, 15.8, 255, 295, DIG. 14

[56] References Cited

U.S. PATENT DOCUMENTS

| Re. 34,417 | 10/1993 | Werner et al. . |
|---|---|---|
| 3,123,153 | 3/1964 | Morkoski et al. . |
| 3,509,946 | 5/1970 | Wheeler . |
| 3,511,319 | 5/1970 | Hansen et al. . |
| 3,961,812 | 6/1976 | Von Allworden ................... 172/275 |
| 4,343,138 | 8/1982 | Neuerburg . |
| 4,426,828 | 1/1984 | Neuerburg . |
| 4,428,185 | 1/1984 | Toillie et al. . |
| 4,443,998 | 4/1984 | Neuerburg . |
| 4,452,034 | 6/1984 | Neuerburg . |
| 4,525,987 | 7/1985 | Werner et al. . |
| 4,557,104 | 12/1985 | Toillie et al. . |
| 4,610,128 | 9/1986 | Ermacora . |
| 4,633,656 | 1/1987 | Willinger . |
| 4,669,256 | 6/1987 | Ermacora et al. . |
| 4,694,640 | 9/1987 | Ermacora et al. . |
| 4,714,123 | 12/1987 | Ermacora et al. . |
| 4,719,742 | 1/1988 | Ermacora et al. . |
| 4,720,964 | 1/1988 | Ermacora et al. . |
| 4,723,396 | 2/1988 | Ermacora . |
| 4,730,445 | 3/1988 | Wolff . |
| 4,761,940 | 8/1988 | Wolff . |
| 4,763,463 | 8/1988 | Ermacora et al. . |
| 4,771,591 | 9/1988 | Ermacora . |
| 4,809,488 | 3/1989 | Neuerburg et al. . |
| 4,811,553 | 3/1989 | Ermacora et al. . |
| 4,833,868 | 5/1989 | Ermacora et al. . |
| 4,848,069 | 7/1989 | Ermacora et al. . |
| 4,879,870 | 11/1989 | Neuerburg . |

(List continued on next page.)

FOREIGN PATENT DOCUMENTS

| 1 304 076 | 8/1962 | France . |
|---|---|---|
| 1 553 252 | 12/1968 | France . |
| 1 557 674 | 11/1970 | Germany . |

OTHER PUBLICATIONS

Camloc France Sarl, Fairchild Fastener Group, No. 2812L01, Jul. 1994, "Information Nouveau Produit".

Primary Examiner—Terry Lee Melius
Attorney, Agent, or Firm—Oblon, Spivak, McClelland, Maier & Neustadt, P.C.

[57] ABSTRACT

An agricultural machine has a fixed structure, a retractable assembly connected to the fixed structure by at least one joint such that said retractable assembly can move to at least one locking position, and a locking mechanism. The locking mechanism includes (i) at least one stop element mounted for movement with one of the fixed structure and retractable assembly and cooperable with the other of the fixed structure and the retractable assembly to lock the retractable assembly in one locking position; (ii) at least one elastic element cooperating with the at least one stop element to bias the at least one stop element into a stop element lock position in cooperation with the other of the fixed structure and the retractable assembly so as to lock the retractable assembly in the locking position. The stop element is enclosed in the stop lock position such that the stop element can be moved from the said stop lock position only by a special tool. Unlocking and retraction of the retractable assembly from the locking position therefore requires simultaneous actions on the special tool and on the retractable assembly.

15 Claims, 4 Drawing Sheets

U.S. PATENT DOCUMENTS

| | | |
|---|---|---|
| 4,896,493 | 1/1990 | Neuerburg . |
| 4,899,523 | 2/1990 | Frumholtz et al. . |
| 4,903,468 | 2/1990 | Haberkorn . |
| 4,909,023 | 3/1990 | Haberkorn et al. . |
| 4,922,693 | 5/1990 | Neuerburg . |
| 4,947,629 | 8/1990 | Ermacora et al. . |
| 4,970,848 | 11/1990 | Neuerburg et al. . |
| 4,974,399 | 12/1990 | Haberkorn . |
| 4,986,061 | 1/1991 | Frumholtz et al. . |
| 4,986,064 | 1/1991 | Ermacora . |
| 4,991,383 | 2/1991 | Ermarcora . |
| 4,999,981 | 3/1991 | Neuerburg . |
| 5,042,243 | 8/1991 | Doering ............................ 460/122 X |
| 5,060,462 | 10/1991 | Helfer et al. . |
| 5,094,063 | 3/1992 | Wattron et al. . |
| 5,101,616 | 4/1992 | Wolff . |
| 5,107,662 | 4/1992 | Haberkorn et al. . |
| 5,107,663 | 4/1992 | Wattron et al. . |
| 5,136,828 | 8/1992 | Ermacora . |
| 5,199,249 | 4/1993 | Wattron et al. . |
| 5,199,250 | 4/1993 | Ermacora et al. . |
| 5,241,809 | 9/1993 | Wolff et al. . |
| 5,353,579 | 10/1994 | Wolff . |
| 5,353,580 | 10/1994 | Wolff . |
| 5,357,737 | 10/1994 | Ermacora et al. . |
| 5,417,042 | 5/1995 | Walch et al. . |
| 5,419,106 | 5/1995 | Gemelli . |
| 5,423,165 | 6/1995 | Walch et al. . |

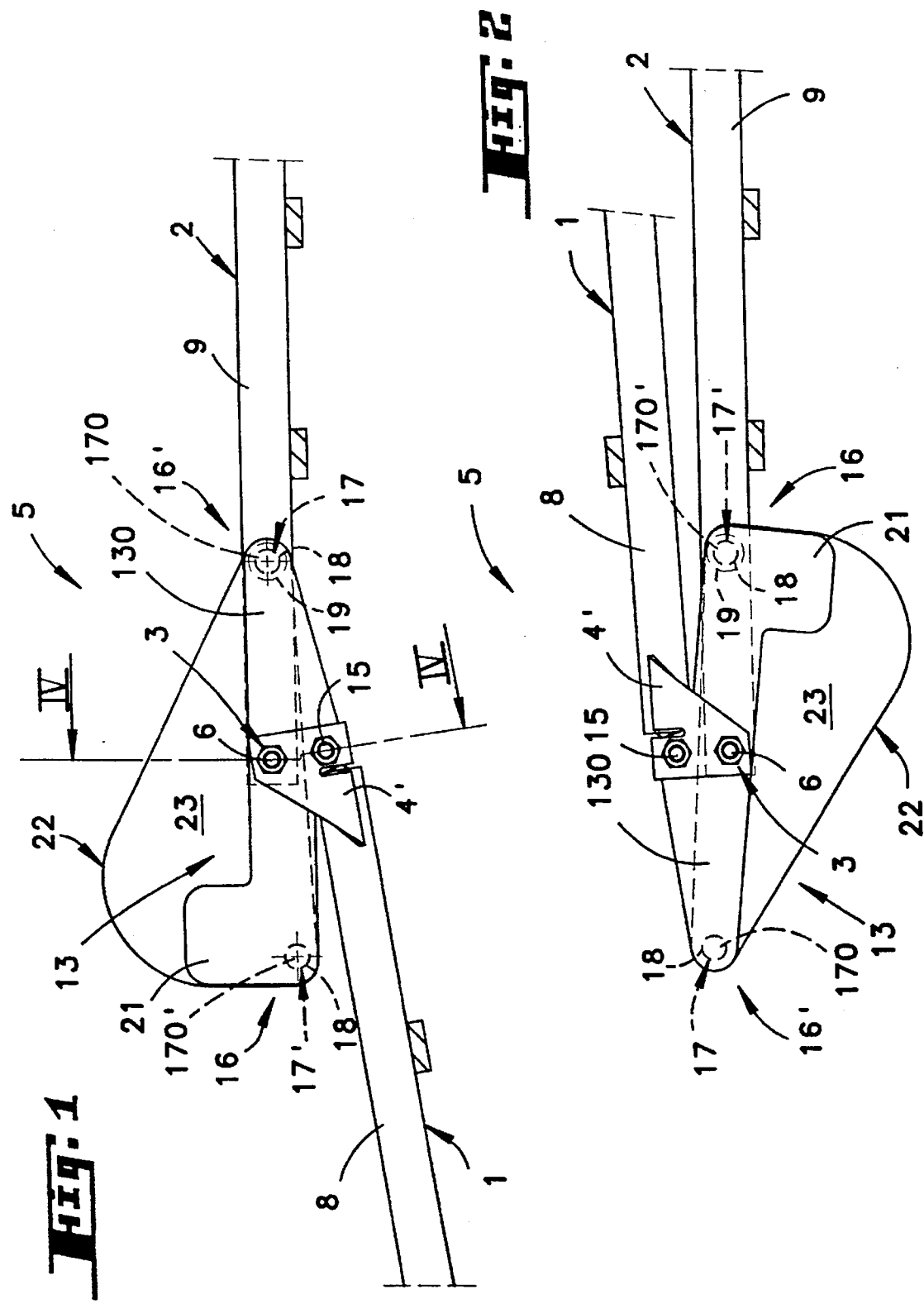

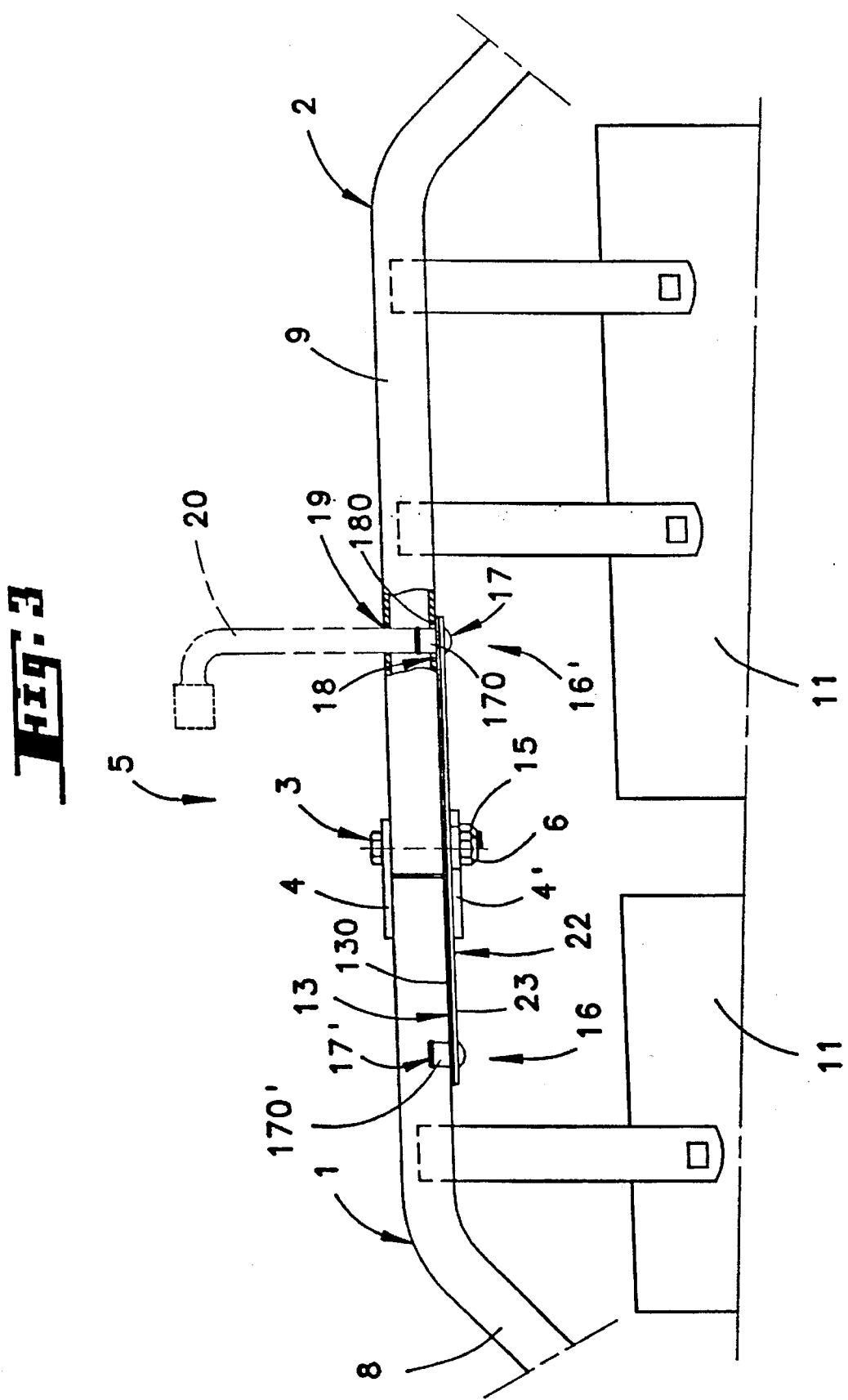

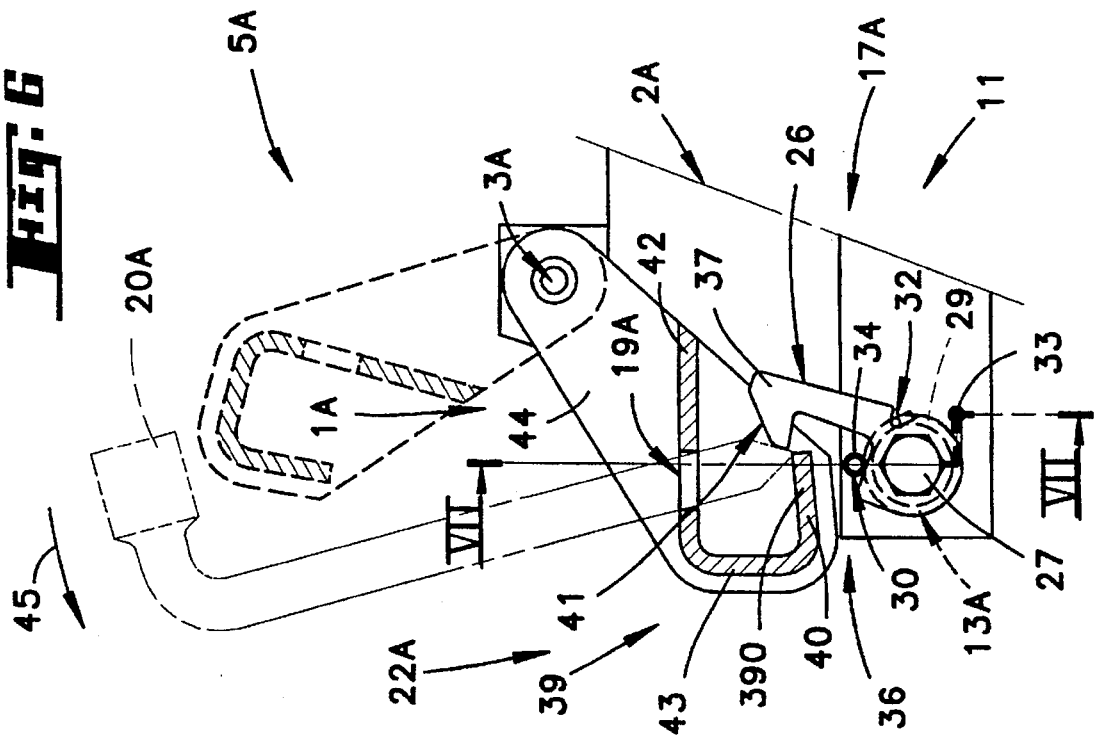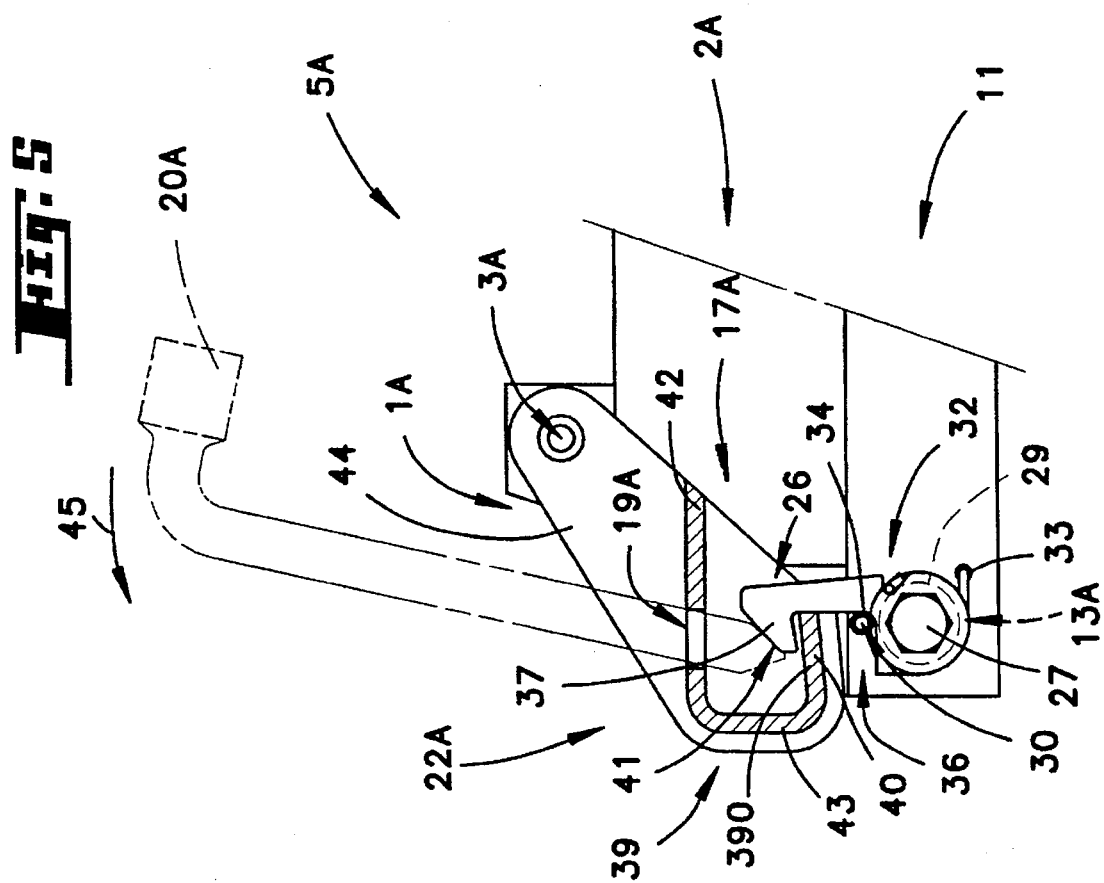

LOCKING MECHANISM FOR AGRICULTURAL MACHINE

BACKGROUND OF THE INVENTION

1. Field of the Invention

This invention pertains to a locking mechanism which may be used on an agricultural machine which includes a retractable assembly connected to a fixed structure by means of at least one joint, said locking mechanism allowing one to immobilize said retractable assembly with respect to said fixed structure in at least one position by means of at least one elastic element and at least one stop element, and to release said retractable assembly by means of a special tool.

2. Description of the Related Art

Such a locking mechanism which can be used on an agricultural machine is known by those who are familiar with this area. This known locking mechanism includes a fixed support which is to be attached to the agricultural machine, which includes a latch which is used to immobilize the retractable assembly with respect to the fixed structure. This latch is connected to a fixed support of the locking mechanism by means of a pivot connection and a helical spring which constantly attempts to release the mechanism, that is to say it causes the latch to swing upward so as to allow the retractable assembly to retract.

In order to ensure locking of the retractable assembly with respect to the fixed structure, a lock is also provided which is used to hold the latch in its locked position. The lock is connected to the fixed support of the locking mechanism by means of a pivot connection with an axis perpendicular to that of the pivot connection of the latch. The lock is equipped with a helical spring which constantly attempts to bias the lock in locked position. The pivot connection which attaches the lock to the fixed support includes a screw, which is threaded into said latch and is connected to the fixed support.

Action on said screw, preferably by means of a special tool, causes the lock to pivot, thereby allowing the latch to be released. As soon as the lock has crossed a critical point, the latch automatically ejects the retractable assembly due to the effect of its helical spring, which then allows said lock to return to its initial position due to the effect of its spring, and after the operator has relaxed his action on the screw.

The operator then retracts the retractable assembly from this unlocked intermediate position into the final retracted position. In the unlocked position the latch remains open and the lock closed due to the effect of the respective helical springs which allow rapid locking of the retractable assembly and the fixed structure. The latch and the lock include relatively complex shapes so that at the time of locking the retractable assembly affects the latch and causes pivoting of the latter downward, which allows the lock to be opened.

At the end of this process the lock is closed automatically due to the action of its helical spring, and the retractable assembly is locked.

This locking mechanism has a certain number of disadvantages. For example, it has a large number of relatively complex parts, which translates into a relatively high cost.

On the other hand, the screw which allows one to control unlocking can be made easily accessible by hand according to placement of the locking mechanism on the agricultural machine and can, for this reason, be operated by hand alone if the springs are weak or worn out.

This known mechanism also has another disadvantage. As was already explained, once the retractable assembly is unlocked, the operator must retract, a second time, the retractable assembly from this intermediate unlocked position into the final retracted position, which presents a major risk. In effect, the operator may not carry out the operation of retraction after unlocking if his attention is diverted. In this case the retractable assembly may remaining in the unlocked intermediate position, which puts persons in the area in danger, when, for example, said retractable assembly is a protective device which encircles power-driven tools.

SUMMARY OF THE INVENTION

It is an object of the present invention to overcome the disadvantages of the aforementioned conventional locking mechanism by providing a simple locking mechanism whose access by hand is impossible and which needs unlocking and retraction in a single step.

For this purpose, a locking mechanism for an agricultural machine, said agricultural machine having a fixed structure and a retractable assembly connected to said fixed structure by at least one joint such that said retractable assembly can move to at least one locking position, comprises at least one stop element mounted for movement with one of said fixed structure and retractable assembly and cooperable with the other of said fixed structure and retractable assembly to lock said retractable assembly in one locking position; at least one elastic element cooperating with said at least one stop element to bias said at least one stop element into a stop element lock position in cooperation with said other of said fixed structure and retractable assembly so as to lock said retractable assembly in said one locking position; and means for enclosing said stop element in said stop lock position such that said stop element can be moved from said stop lock position only by a special tool, whereby unlocking and retraction of the retractable assembly from said one locking position requires simultaneous actions on said special tool and on said retractable assembly.

According to another feature of the invention, said means for enclosing said stop element includes at least one calibrated opening, said at least one calibrated opening being sized and positioned such that said special tool can press on said stop element when said stop element is in said stop element lock position.

According to another feature of the invention, said joint is a pivot joint.

According to another feature of the invention, said locking mechanism comprises a protective device in order to avoid operator injuries during operation of said locking mechanism.

According to another feature of the invention, said calibrated opening is located approximately opposite said stop element when said stop element is in said stop lock position.

According to another feature of the invention, said elastic element comprises an elongated part having said stop element at one end thereof, said elastic element having another stop element at another end thereof so that said retractable assembly may be locked in another locking position by said another stop element, and wherein said elastic element further includes a handle at said another end thereof so that said another stop element may be manually moved via said handle to unlock said retractable assembly from said another locking position.

According to another feature of the invention, said elastic element is comprised of at least one plate made of spring steel.

According to another feature of the invention, said elastic element has, at said one end, a width no greater than an external dimension of a profile of said fixed structure, said one end being located at said profile when said retractable assembly is in said one locked position so that access and manual gripping of said elastic element is impossible when said retractable assembly is in said one locked position.

According to another feature of the invention, said stop elements each comprise a lug and said means for enclosing comprises an opening in said profile of said fixed structure, said calibrated opening being located approximately opposite said opening in said profile.

According to another feature of the invention, said protective device is comprised of a tab made of flexible material and attached to said elastic element.

According to another feature of the invention, said pivot joint comprises two flanges which form a tread located adjacent one end of said retractable assembly, one end of the fixed structure and said elastic element with said protective cap being fitted in said tread; and a swivel pin which passes through said tread, the one end of said fixed structure, the elastic element and the protective device to pivotally connect said tread and said elastic element, said fixed structure to said protective device.

According to another feature of the invention, said elastic element is comprised of an helical spring.

According to another feature of the invention, said stop element comprises a latch pivotally connected to said fixed structure by a pivot connection.

According to another feature of the invention, said pivot connection includes at least one screw on which said latch is mounted, said helical spring engaging said latch.

According to another feature of the invention, an agricultural machine comprising a fixed structure, a retractable assembly connected to said fixed structure by at least one joint such that said retractable assembly can move to one locking position, and a locking mechanism, includes at least one stop element mounted for movement with one of said fixed structure and retractable assembly and cooperable with the other of said fixed structure and retractable assembly to lock said retractable assembly in one locking position; at least one elastic element cooperating with said at least one stop element to bias said at least one stop element into a stop element lock position in cooperation with said other of said fixed structure and retractable assembly to lock said retractable assembly in said one locking position; and means for enclosing said stop element in said stop lock position such that said stop element can be moved from said stop lock position only by a special tool, whereby unlocking and retraction of the retractable assembly from said one locking position requires simultaneous actions on said special tool and on said retractable assembly.

BRIEF DESCRIPTION OF THE DRAWINGS

A more complete appreciation of the invention and many of the attendant advantages thereof will be readily obtained as the same becomes better understood by reference to the following detailed description when considered in connection with accompanying drawings, wherein:

FIG. 1 is a side view of a first embodiment of the locking mechanism when the retractable assembly is in an unfolded position;

FIG. 2 is a side view of the locking mechanism shown in FIG. 1, when the retractable assembly is in a folded up position;

FIG. 3 is a top view of the device shown in FIG. 1 with the special tool sketched in dot-and-dash lines;

FIG. 5 is a side view of a second embodiment of the locking mechanism in the locked position with the special tool sketched in dot-and-dash lines;

FIG. 6 is a side view of the locking mechanism shown in FIG. 5 during unlocking and with one of the unlocked positions sketched in dash lines and the special tool in dot-and-dash lines.

DETAILED DESCRIPTION OF THE PREFERRED EMBODIMENTS

Figure 7:
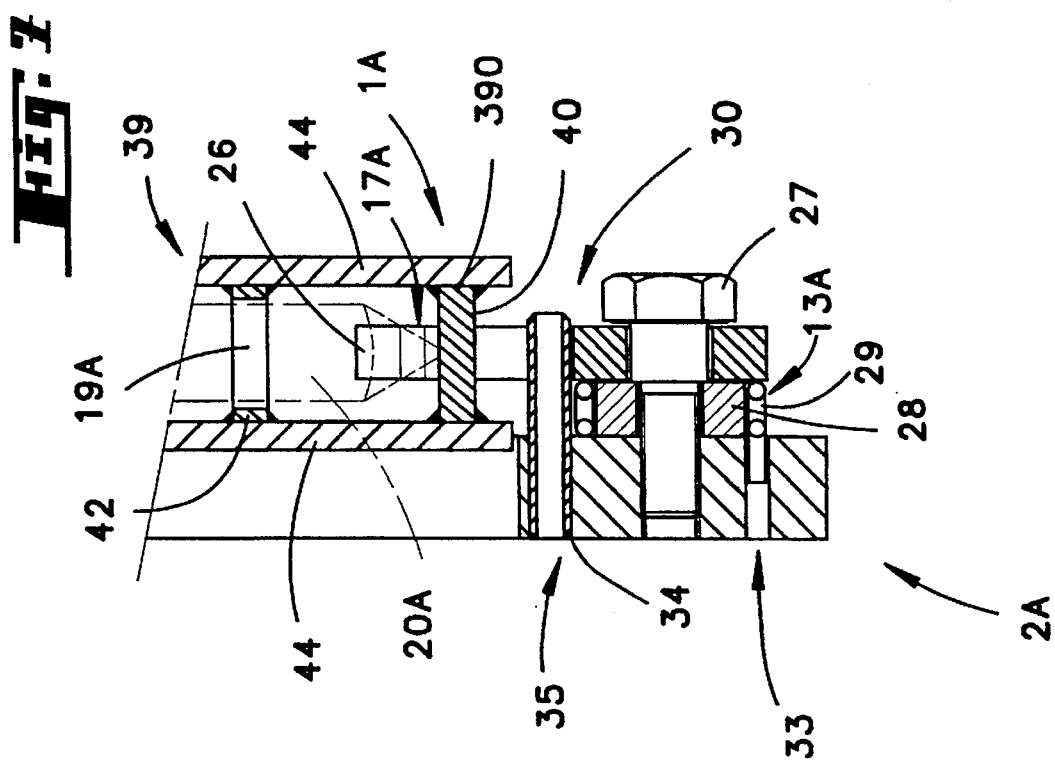
FIG. 7 is a sectional view along plane VII—VII defined in FIG. 6, on a different scale.
Figure 4:
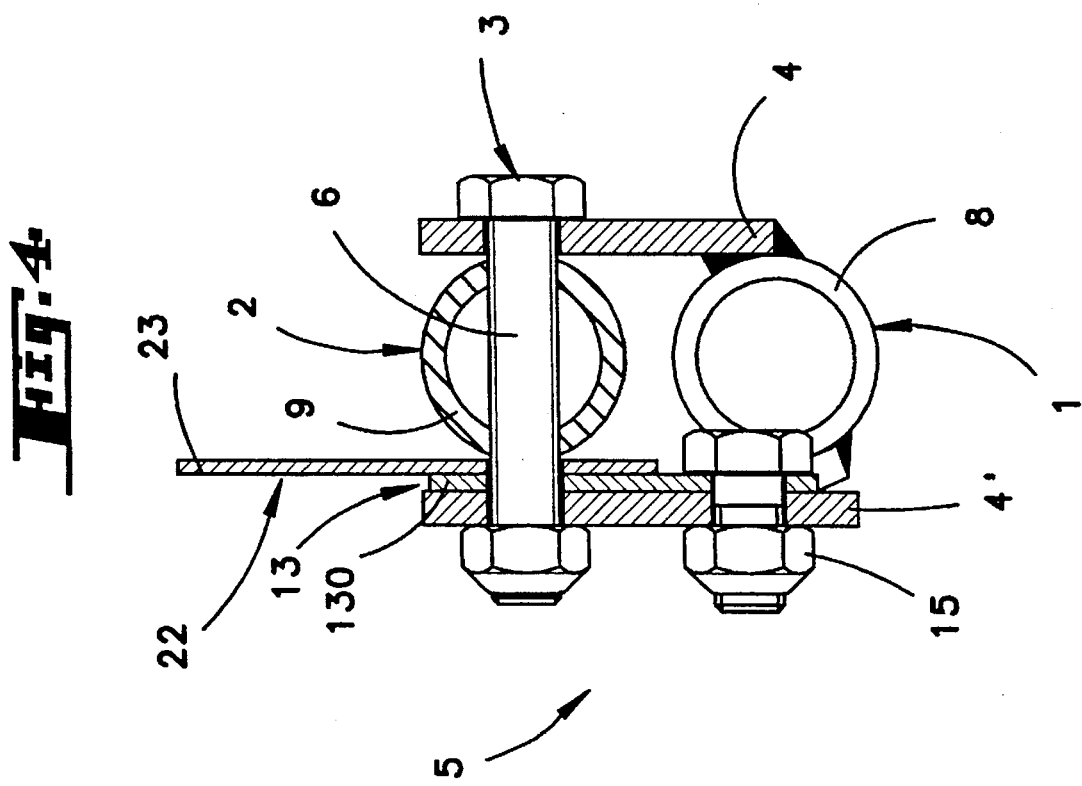
FIG. 4 is a sectional view along plane IV—IV defined in FIG. 1, on a different scale.

Referring to FIGS. 1 to 4, a locking mechanism (5) is arranged between a retractable assembly (1) and a fixed structure (2), the retractable assembly (1) being connected to the fixed structure (2) by means of a joint (3) of the pivot type.

According to the embodiment, the pivot joint (3) is comprised of two flanges (4, 4') attached near the end of the retractable assembly (1) and which extend upward when the retractable assembly (1) is unfolded. The end of the fixed structure (2) fits between the two flanges (4, 4') with an elastic element (13) fitted between the end of the fixed structure (2) and the flange (4'), and a swivel pin (6) extends through the two flanges (4, 4'), the end of the fixed structure (2) and the elastic element (13). According to this embodiment, said swivel pin (6) is a bolt having ends which press on the external sides of the flanges (4, 4') but provide sufficient play to permit the necessary pivoting.

The retractable assembly (1) and the fixed structure (2) each includes a respective tube (8, 9).

According to this embodiment, the elastic element (13) is an elongated metal plate (130) made of spring steel and attached at the retractable assembly (1) by a bolt (15) and the swivel pin (6). The locking mechanism (5) has one locking position when the retractable assembly (1) is unfolded and another locking position when the latter is folded up.

The elastic element (13) includes a respective stopping element (17, 17') at each of its two ends (16, 16'). When the retractable assembly (1) is in the unfolded locked position of FIG. 1, the direction of elongation of the plate (130) made of spring steel extends at least approximately parallel to the fixed structure (2) with the end (16') extending towards the fixed structure (2), and is located between the flange (4') and the tubes (8, 9). The other end (16) of the elastic element (13), formed as an integral handle (21) and located around the stopping element (17'), lies in an extension of the tube (9) of the fixed structure (2).

In this embodiment, each stopping element (17, 17') comprises a lug (170, 170') riveted on said plate (130) of spring steel. The elastic element (13) has, at least at its end (16'), a width (i.e., the vertical distance in the plane of FIGS. 1 and 2) less than or equal to the external diameter of the tube (9) of the fixed structure (2).

Such an arrangement makes access and gripping of the elastic element (13) impossible by hand, except at the integral handle (21). The width of the handle (21) is greater than the external diameter of the tube (9) so that the operator can easily access said elastic element (13) by hand when the retractable assembly (1) is in the folded back locked position of FIG. 2.

When the retractable assembly (1) is in one of the locked positions of FIGS. 1 or 2, each stopping element (17, 17') is housed in a stop lock position in a complementary element (18) which is, in this embodiment, a locking opening (180) provided in the fixed structure (2). The lugs (170, 170') of the stopping elements may be introduced or withdrawn from the stop lock position in the locking openings (180) by elastically deforming the respective end of the elastic element (13) outwardly, that is, away from the tube (9).

In order to ensure proper housing of the stop elements (17, 17') in the locking opening (180), the diameter of the locking opening (180) is greater than the external diameters of the stopping elements (17, 17').

The locking opening (180) is a hole provided in the tube (9) of the fixed structure (2) and is offset with respect to the pivot joint (3) along the length of the tube (9). There is a calibrated opening (19) in the tube (9) approximately opposite the locking opening (180) which allows one to control unlocking only by means of a special tool (20) when the retractable assembly (1) is in its unfolded position (FIG. 1).

The calibrated opening (19) is of a diameter which is smaller than the diameter of the locking opening (180) and the external diameter of the special tool (20) is slightly smaller than the diameter of the calibrated opening (19). When one of the stop elements (17, 17') is housed in the stop lock position in the locking opening (180), the elastic element (13) practically unloaded.

The locking mechanism (5) is also provided with a protective device (22) which is used to protect the operator by avoiding jamming areas which would be capable of injuring the operator. For this purpose a tab (23) is attached laterally to the elastic element (13) by means of the lugs (170, 170'). The tab (23) is made of flexible material so that it does not interfere with deformation of the elastic element (13) during unlocking.

The tab (23) has a curved shape which extends outward from the handle (21) and converges toward the end (16') of the elastic element (13).

When the retractable assembly (1) is in the unfolded position (FIGS. 1 and 3) the stop element (17) is housed in the locking opening (180). In order to bring the retractable assembly (1) from the unfolded position to the folded up position, the operator inserts the special tool (20) through the calibrated opening (19) and presses it on the lug (170) of the stop element (17). The operator then pushes on the special tool (20) to outwardly deform the elastic element (13) until the stop element (17) is dislodged from the locking opening (180). Finally, while holding the special tool (20) in this position the operator can rotate the retractable assembly (1) about the pivot joint (3) into a folded up position. The stop element (17') will be automatically housed in the stop lock position in the locking opening (180) when in the folded up position, due to the elasticity of the metal plate (130) made of spring steel, after the special tool (20) has been withdrawn.

In order to again bring the retractable assembly (1) into the initial position of FIG. 1, the operator proceeds in the same manner, except that he may dislodge the stop element (17') from the locking opening (180) by using the handle (21).

According to a second embodiment shown in FIGS. 5 to 7, a locking mechanism (5A) is arranged between a retractable assembly (1A) and a fixed structure (2A), said retractable assembly (1A) being connected to said fixed structure (2A) by means of a pivot joint (3A). The fixed structure (2A) includes a stop element (17A) connected to the latter by means of a pivot type connection as described below.

According to this embodiment, the stop element (17A) is comprised of a latch (26) which is freely rotatable on a screw (27) threaded into the fixed structure (2A). In order to ensure good tightening of the screw (27), it is provided with a spacer (28) located between the screw (27) and the fixed structure (2A). The latch (26) is loosely held between the spacer (28) and the head of the screw (27) so that it can freely pivot on said screw (27).

The latch (26) is maintained in position on said screw (27) by a helical spring (29) which is coiled on the external part of the spacer (28) and by a stop (30). One end of the helical spring (29) presses on a slot (32) provided for this purpose on the latch (26). Its other end is inserted in a hole (33) of the fixed structure (2A).

The stop (30) limits the rotation of the latch (26) caused by the helical spring (29). The stop (30) may be comprised of an elastic pin (34) housed in a second hole (35) made in the fixed structure (2A). The elastic pin (34) is located above the screw (27), in the vicinity of the latter, so that it can limit the movement range of said latch (26) in two directions. For this purpose the latch (26) includes a slot (36) extending over an arc which is at least approximately equal to 90°, in which the elastic pin (34) is located.

The latch (26) also includes a tip (37) in its upper part which will be housed in a stop lock position within a complementary element (39) which is, according to this second embodiment, a catch (390) in the form of a horizontal U, which is unitary with the retractable assembly (1A). The catch (390) includes a lower part (40) located under the tip (37) of the latch (26) when the retractable assembly (1A) is locked. For this purpose, in order to ensure good locking, the lower part (40) is oriented slightly upward and the tip (37) of the latch (26) is oriented slightly downward so that the two will reliably lock to one another. The tip (37) of the latch (26) also includes an upper part (41) which is inclined forward and downward in order to be able to cooperate with a special tool (20A) and to assure the automatic locking of the retractable assembly (1A).

The catch (390) also includes an upper part (42) which is approximately parallel to the lower part (40) and which is provided with a calibrated opening (19A) located approximately above the tip (37) of the latch (26). Such an arrangement allows one to gain access to the latch (26) and to control unlocking of the retractable assembly (1A) only by means of the special tool (20A).

This locking mechanism (5A) is located on the agricultural machine (11) so that the latch (26) is not accessible by hand when the retractable assembly (1A) is locked. For this purpose the latch (26) is completely enclosed by means of the fixed structure (2A) and the catch (390) which includes the upper part (42) provided with the calibrated opening (19A), the lower part (40) as well as a front side (43), and two lateral sides (44) which are attached to said lower part (40) and said upper part (42).

Such a design forms a protective device (22A) which prevents the operator from being injured.

The stop element (17A) is housed in the catch (390) when the retractable assembly (1A) is in its locked position. In order to bring the retractable assembly (1A) from the locked position into the unlocked position, the operator engages the special tool (20A) in said calibrated opening (19A) so that it presses on tip (37). He then rotates the tool (20A) in the direction (45) while keeping it engaged in the calibrated opening (19A) until the latch (26) separates from the catch (390). In this intermediate position (FIG. 6), the operator can rotate the retractable assembly (1A) about the pivot joint (3A) into the retracted position (shown in dash lines), while holding the latch (26) removed by means of the special tool (20A). The special tool (20A) can be withdrawn from the calibrated opening (19A) when the latch (26) can no longer penetrate in the catch (390), which will allow the helical spring (29) to return said latch (26) to its initial position.

In order to again bring the retractable assembly (1A) into its initial position, the operator allows said retractable assembly (1A) to return to its locking position, due to its own weight if the latter is retracted vertically, which will allow automatic locking of the locking mechanism (5A) because of the helical spring (29) and the shape of the tip (37) which is automatically retracted by the catch (390).

Finally, different modifications are possible, especially with respect to the make-up of the different elements or by substitution of equivalent techniques, without thereby departing from the scope of the claims. For example, the locking mechanism (5) of the first embodiment may be provided with several locking openings (180), so that one can lock the retractable assembly (1) in several unfolded or folded positions.

Conversely, it is also possible to suppress locking when the retractable assembly (1) is in the folded up position by eliminating the stop element (17').

The locking mechanism (5, 5A) can also be installed on the agricultural machine (11) in different positions.

It is also conceivable to design the protection of the latch (26) in a different manner without using the fixed structure (2A); the catch (390) and the lateral parts (44) will then ensure enclosing of said latch (26).

What is claimed as new and desired to be secured by Letters Patent of the United States is:

1. A locking mechanism for an agricultural machine, said agricultural machine having a fixed structure and a retractable assembly connected to said fixed structure by at least one joint such that said retractable assembly can move to at least one locking position, said locking mechanism comprising:

at least one stop element mounted for movement with one of said fixed structure and retractable assembly and cooperable with the other of said fixed structure and retractable assembly to lock said retractable assembly in one locking position;

at least one elastic element cooperating with said at least one stop element to bias said at least one stop element into a stop element lock position in cooperation with said other of said fixed structure and retractable assembly so as to lock said retractable assembly in said one locking position; and means for enclosing said at least one stop element in said stop lock position such that said at least one stop element can be moved from said stop lock position only by a special tool, whereby unlocking and retraction of the retractable assembly from said one locking position requires simultaneous use of said special tool to move said stop element from said stop lock position and thereby unlock the retractable assembly and the application of a force on said retractable assembly to retract the retractable assembly.

2. Locking mechanism according to claim 1, wherein said means for enclosing said stop element includes at least one calibrated opening, said at least one calibrated opening being sized and positioned such that said special tool can press on said stop element when said stop element is in said stop element lock position.

3. Locking mechanism according to claim 1, wherein said joint is a pivot joint.

4. Locking mechanism according to claim 1, including a protective device in order to avoid operator injuries during operation of said locking mechanism.

5. Locking mechanism according to claim 2, wherein said calibrated opening is located approximately opposite said stop element when said stop element is in said stop lock position.

6. Locking mechanism according to claim 2, wherein said elastic element comprises an elongated part having said stop element at one end thereof, said elastic element having another stop element at another end thereof so that said retractable assembly may be locked in another locking position by said another stop element, and wherein said elastic element further includes a handle at said another end thereof so that said another stop element may be manually moved via said handle to unlock said retractable assembly from said another locking position.

7. Locking mechanism according to claim 6, wherein said elastic element is comprised of at least one plate made of spring steel.

8. Locking mechanism according to claim 7, wherein said elastic element has, at said one end, a width no greater than an external dimension of a profile of said fixed structure, said one end being located at said profile when said retractable assembly is in said one locked position so that access and manual gripping of said elastic element is impossible when said retractable assembly is in said one locked position.

9. Locking mechanism according to claim 8, wherein said stop elements each comprise a lug and said means for enclosing comprises an opening in said profile of said fixed structure, said calibrated opening being located approximately opposite said opening in said profile.

10. Locking mechanism according to claim 4, wherein said protective device is comprised of a tab made of flexible material and attached to said elastic element.

11. Locking mechanism according to claim 3, wherein said pivot joint comprises:

two flanges located adjacent one end of said retractable assembly, one end of the fixed structure and said elastic element being fitted between said flanges; and a swivel pin which passes through said flanges, the one end of said fixed structure and the elastic element to pivotally connect said flanges and said elastic element to said fixed structure.

12. Locking mechanism according to claim 1, wherein said elastic element is comprised of a helical spring.

13. Locking mechanism according to claim 12, wherein said stop element comprises a latch pivotally connected to said fixed structure by a pivot connection.

14. Locking mechanism according to claim 13, wherein said pivot connection includes at least one screw on which said latch is mounted, said helical spring engaging said latch.

15. An agricultural machine comprising a fixed structure, a retractable assembly connected to said fixed structure by at least one joint such that said retractable assembly can move to at least one locking position, and a locking mechanism, said locking mechanism comprising:

at least one stop element mounted for movement with one of said fixed structure and retractable assembly and cooperable with the other of said fixed structure and retractable assembly to lock said retractable assembly in one locking position;

at least one elastic element cooperating with said at least one stop element to bias said at least one stop element into a stop element lock position in cooperation with said other of said fixed structure and retractable assembly so as to lock said retractable assembly in said one locking position; and means for enclosing said at least one stop element in said stop lock position such that said at least one stop element can be moved from said stop lock position only by a special tool, whereby unlocking and retraction of the retractable assembly from said one locking position requires simultaneous use of said special tool to move said stop element from said stop lock position and thereby unlock the retractable assembly and the application of a force on said retractable assembly to retract the retractable assembly.

* * * * *